Patented Oct. 3, 1950

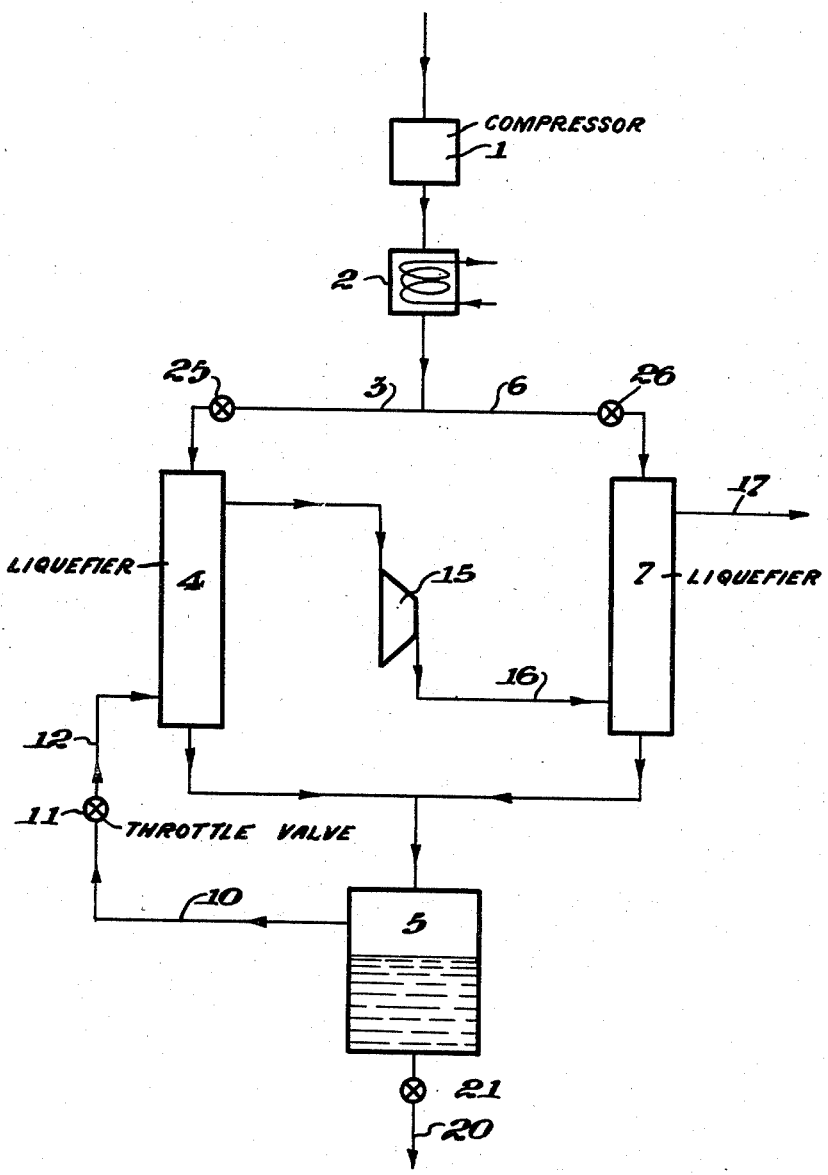

2,524,397

UNITED STATES PATENT OFFICE 2,524,397

GAS SEPARATION METHOD AND APPARATUS

Irving Roberts and Duffer B. Crawford, Jeannette, Pa., assignors to Elliott Company, Jeannette, Pa., a corporation of Pennsylvania Application September 2, 1948, Serial No. 47,376

4 Claims. (Cl. 62—175.5)

This invention relates to the separation of one constituent of a gaseous mixture by refrigeration and liquefaction under pressure; it is particularly applicable to the separation of sulfur dioxide from waste furnace gases and to its recovery in liquid form.

It is among the objects of this invention to provide an improved method and apparatus for separating the larger portion of a relatively easily liquefiable constituent of a gaseous mixture, such as sulfur dioxide from waste furnace gases resulting from the roasting of sulfide ores, by refrigeration and liquefaction under pressure and of recovering the desired constituent so separated in liquid form with a minimum consumption of power per pound of liquid constituent separated.

In accordance with this invention, a mixture of gases containing a desired constituent that is more easily liquefied than the remaining gas or gases, after being suitably cleaned and dried, is compressed to a pressure substantially above atmospheric and then divided into two unequal parts. The first, and smaller, part is cooled to a sufficiently low temperature to liquefy some of the desired constituent. The second, and larger, part of the compressed mixture is likewise cooled so as to liquefy some of its contained desired constituent. The constituent that has been liquefied in both parts of the mixture is recovered in a receiver. The cold, high pressure gases from which the liquid constituent has been removed, referred to herein as the "stripped gases," are first expanded to an intermediate pressure to lower their temperature still further and are then utilized to cool the first part of the mixture. The same gases are then recooled to an even lower temperature by further expansion to substantially atmospheric pressure with the performance of external work and utilized to cool the second part of the mixture.

The preferred embodiment of this invention is diagrammaticaly illustrated in the accompanying drawing with reference to the recovery of sulfur dioxide from waste furnace gases containing it; but it is to be understood that this invention is equally applicable to the separation and recovery of other gases capable of selective liquefaction within the ranges of temperature and pressure prevailing in the system.

A mixture of gases, such as waste furnace gases from the roasting of pyrites, usually containing from 7 to 10 per cent of sulfur dioxide, is thoroughly cleaned and dried in conventional apparatus not shown in the drawing. The mixture is then introduced into a compressor 1, where it is compressed to a pressure of about 12 atmospheres absolute. The heat of compression is removed by passing the compressed mixture through an after-cooler 2, which may be of the water-cooled type and in which the mixture is cooled to a temperature of about 100° F. It is then divided into two unequal parts. One part, preferably about one-fourth of the whole, is led by a pipe 3 to a liquefier 4, where it is cooled to about −21° F. by indirect heat exchange with cold stripped gases flowing in a countercurrent direction through the liquefier. Some of the sulfur dioxide in this part of the mixture is thereby liquefied and is collected in a receiver 5. The second part, or remainder, of the compressed mixture is led by a pipe 6 to a second liquefier 7, where it is cooled to a somewhat lower temperature than the first part, or around −30° F., also by indirect heat exchange with cold stripped gases flowing in a countercurrent direction through the same liquefier. In this second liquefier, as in the first, some of the sulfur dioxide in the mixture is liquefied under pressure and is likewise collected in the receiver 5.

The high pressure, stripped gases from both portions of the mixture, representing the highly volatile, unliquefied portion thereof (largely nitrogen, together with some oxygen and sulfur dioxide), are removed from the top of receiver 5 by a pipe 10 and are then expanded by throttling in throttle-valve 11 to an intermediate pressure of about 4 atmospheres. This expansion reduces their temperature to around −30° F., and these cold gases are then led by a pipe 12 to liquefier 4, where they cool the first part of the compressed mixture, as previously described. The stripped gases warmed in liquefier 4 and still at a pressure of about 4 atmospheres are expanded to substantially atmospheric pressure with the performance of external work in, for example, an expansion turbine 15, which lowers the temperature of those gases to about −90° F. They are then led by a pipe 16 to liquefier 7, where, as previously described, they are utilized to cool the second, and larger, part of the compressed mixture. The stripped gases warmed in this liquefier are finally discharged into the atmosphere through a pipe 17.

Liquid sulfur dioxide is removed at intervals from the receiver 5 through a pipe 20 by opening a valve 21, and may then be stored in suitable receptacles for transportation to its place of ultimate use.

It is a feature of this invention that the entering mixture under high pressure is divided into two parts, which are separately cooled and liquefied, and that all of the refrigeration required in the system to liquefy the sulfur dioxide and to compensate for heat leakage and other thermodynamic losses is obtained by the expansion of the stripped gases with the performance of external work in an expansion turbine; which is more efficient that a reciprocating expansion engine. Since these stripped gases are initially under considerable pressure, they cannot be advantageously expanded in an expansion turbine alone, which operates most efficiently when the expansion ratio does not exceed four to one and when no condensation of liquefiable constituents can take place in the turbine. For this reason, the stripped gases are first throttled to an intermediate pressure, warmed by heat exchange with part of the incoming mixture, and then further expanded with the performance of external work in the expansion turbine.

The relative volumes of the two parts into which the compressed mixture is divided are so proportioned that the smallest part can be cooled and some of its contained sulfur dioxide liquefied by heat exchange with all of the stripped gases obtained in the process after they have been throttled to an intermediate pressure. The remaining, and larger part of the compressed mixture is then cooled by the same stripped gases after they have been recooled to a lower temperature than before by expansion to substantially atmospheric pressure with the performance of external work. As previously indicated, the compressed mixture is divided in a ratio of roughly one to three; but it may be desirable to change this ratio under various operating conditions. This can be easily done by proper manipulation of valves 25 and 26 in pipes 3 and 6, respectively. When the amount of sulfur dioxide in the original mixture is about 7 per cent by weight, it is possible to recover by the practice of this invention around 62 per cent of this product. When the concentration of sulfur dioxide in the original mixture is above 7 per cent, there will be a higher percentage recovery of liquid sulfur dioxide. That recovery may also be increased by increasing the pressure of the mixture introduced into the apparatus.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of separating the greater part of an easy liquefiable constituent of a gaseous mixture by cooling and partial condensation alone and of recovering the separated constituent in liquid form that includes the following steps: compressing the mixture to a pressure substantially above atmospheric, dividing the mixture into two parts, cooling the first and second parts separately by indirect heat exchange to liquefy some of the desired constituent therein, recovering the constituent so liquefied from both parts of the mixture, expanding to an intermediate pressure the stripped gases obtained from both parts of the mixture by removal of the liquefied constituent, utilizing the stripped gases so expanded to effect all of said cooling of the first part of the mixture, recooling the stripped gases after they have been finally warmed in cooling the first part of the mixture by expanding said gases to substantially atmospheric pressure with performance of external work, and utilizing the stripped gases so recooled to effect all of said cooling of the second part of the mixture.

2. A method according to claim 1, in which said first part of the gaseous mixture is smaller than said second part.

3. A method according to claim 1, in which said mixture is compressed to a pressure of about 12 atmospheres absolute, in which said first part of the compressed mixture is about one-third the volume of said second part, and in which the said stripped gases are expanded to an intermediate pressure of about 4 atmospheres absolute by throttling.

4. A method according to claim 1, in which the desired liquefiable constituent of the gaseous mixture is sulphur dioxide.

IRVING ROBERTS.
DUFFER B. CRAWFORD.

REFERENCES CITED

The following references are of record in the file of this patent:

UNITED STATES PATENTS

| Number | Name | Date |
| --- | --- | --- |
| 1,939,696 | Hasche | Dec. 19, 1933 |
| 2,000,992 | Schlitt | May 14, 1935 |